United States Patent [19]

Deal

[11] Patent Number: 4,880,107
[45] Date of Patent: Nov. 14, 1989

[54] TABLE TOP CHAIN LINK WITH RIB

[75] Inventor: Douglas O. Deal, Durham, N.C.

[73] Assignee: Rexnord Corporation, Milwaukee, Wis.

[21] Appl. No.: 80,753

[22] Filed: Jul. 31, 1987

[51] Int. Cl.$^4$ ............................................. B65G 17/00
[52] U.S. Cl. ..................................... 198/779; 198/853
[58] Field of Search ............... 198/853, 852, 851, 635, 198/779

[56] References Cited

U.S. PATENT DOCUMENTS

| | | |
|---|---|---|
| 2,098,971 | 11/1937 | Perkins . |
| 2,141,876 | 12/1938 | Perkins . |
| 2,154,844 | 4/1939 | Harker et al. . |
| 2,237,345 | 4/1941 | Frentzel, Jr. et al. . |
| 2,681,728 | 6/1954 | Boron ................................... 198/851 |
| 3,262,550 | 7/1966 | Kampfer . |
| 3,279,586 | 10/1966 | Kampfer .............................. 198/852 |
| 3,774,752 | 11/1973 | Harvey .................................. 198/852 |
| 3,804,232 | 4/1974 | Freiwald et al. . |
| 3,881,593 | 5/1975 | Mushovic et al. ................... 198/853 |
| 4,051,949 | 10/1977 | Lapeyre . |
| 4,153,152 | 5/1979 | Lapeyre .............................. 198/851 |
| 4,171,045 | 10/1979 | Lapeyre .............................. 198/635 |
| 4,172,516 | 10/1979 | Curl et al. ........................... 198/608 |
| 4,184,588 | 1/1980 | Lapeyre .............................. 198/778 |
| 4,185,734 | 1/1980 | Bross ............................... 198/635 X |
| 4,244,457 | 1/1981 | Ernst ................................... 198/851 |
| 4,436,200 | 3/1984 | Hodlewsky et al. ................ 198/851 |
| 4,438,838 | 3/1984 | Hodlewsky et al. ................ 198/853 |
| 4,473,365 | 9/1984 | Lapeyre .......................... 198/853 X |
| 4,556,142 | 12/1985 | Lapeyre .......................... 198/853 X |
| 4,682,687 | 7/1987 | Leege et al. ..................... 198/853 X |
| 4,754,872 | 7/1988 | Damkjaer ........................... 198/852 |

FOREIGN PATENT DOCUMENTS 1199301 1/1986 Canada ............................... 198/779
3701772 8/1987 Fed. Rep. of Germany .

Primary Examiner—Robert J. Spar
Assistant Examiner—Cheryl L. Gastineau
Attorney, Agent, or Firm—Richard E. Jenkins

[57] ABSTRACT

An improved table top chain link providing a plurality of upstanding ribs on the top surface thereof in order to allow for cooperative engagement with a transfer comb and the in-line transfer of articles to and from the transfer comb to the conveyor belt.

15 Claims, 7 Drawing Sheets

TABLE TOP CHAIN LINK WITH RIB

TECHNICAL FIELD

This invention relates generally to conveyors and more particularly to a novel and improved table top chain link therefor having rib elements to facilitate the transfer of articles to and from the conveyor belt onto a cooperative comb.

BACKGROUND ART

A variety of multiple link chains are known which generally include individual lengths which are pivotably connected to like links by means of pivot pins in order to permit relative pivotable movement of adjacent links about the axis of the pivot pin. This type of chain is normally arranged in an endless configuration and driven by a sprocket wheel.

Several basic types of such a chain are known. The first type is called a mattop chain and is well known in the trade. This type of chain includes a plurality of modules which are constructed in a multiple link width wherein the plurality of links across a given width of conveyor are pivotably connected to a corresponding plurality of lengths both ahead and behind thereof. A conveyor belt or the like of any width and length may be assembled from the mattop chain links and the conveyor belt is adapted to transfer articles to and from the belt by means of a cooperative transfer comb. However, a limitation to a mattop link conveyor belt is that its construction will only allow for straight line movement and, as desired, transfer of articles from the conveyor to a cooperatively associated transfer comb. The mattop chain link conveyor belt is not adapted to accommodate a curve or bend during the upper run thereof. This type of conveyor belt is described in a number of patents including U.S. Pat. Nos. 4,171,045 and 4,051,949 to Lapeyre.

A second general type of modular conveyor belt is constructed of what are commonly known as table top chain links. These links are typically connected together into an endless belt of only a single link width. A modular conveyor belt constructed of table top chain links is desirable since the links are relatively pivotably movable both vertically and horizontally so that the conveyor belt can accommodate a bend or curve during the upper run of the endless belt. However, although the conveyor belt constructed of table top chain links has the distinct advantage of being able to accommodate a curve or bend during the upper pathway thereof, the transfer of articles therefrom can be accomplished only by side-transfer techniques requiring a parallel and separate conveyor belt onto which articles are directed from the first belt by a guide or the like. A manner in which to effect straight line transfer from a table top chain link conveyor belt has not been known until now. Patents of possible interest relating to table top chain links include U.S. Pat. Nos. 4,436,200; 3,804,232; and 3,262,550.

A variation of the table top chain link is what is known as the low backline pressure roller chain which essentially comprises a table top chain having a plurality of small, closely-spaced rollers on the top surface thereof in order to protect products from damage by significantly reducing backline pressure during accumulation on the conveyor belt. At the same time, the chain provides for positive motion when required. This type of table top chain also is adapted for both vertical and horizontal pivotable movement so as to accommodate a curved pathway, but up to this time only side transfer techniques requiring a separate and parallel conveyor belt have been utilized in order to transfer articles being conveyed thereby. Applicant's invention provides for a new and improved low backline pressure table top chain link which will also accommodate in-line transfer of articles being conveyed thereby onto a cooperatively associated transfer comb and conveyor belt or the like.

Therefore, it can be appreciated that applicant has provided for a new type of table top chain link which allows for the construction of a modular conveyor belt having the heretofore unavailable capability of in-line transfer of articles being conveyed thereby onto another conveyor belt. Both conventional and low backline pressure table top chain links are contemplated to be modified according to applicant's invention.

DISCLOSURE OF THE INVENTION

In accordance with the present invention, a table top chain link for a conveyor belt is provided which includes a plurality of elongate rib elements on the top surface thereof in order to facilitate in-line transfer to and from a cooperatively associated comb. The link is of the table top chain type having a greater width than length and used for constructing a single-link wide endless conveyor belt with an upper and lower run and adapted to traverse one or more curves in the pathway along the upper run thereof. The conveyor belt is widely used by manufacturers to convey packaged products such as canned foods, automobile parts and consumer product packages.

The conventional link defines a female portion in the medial portion of the leading edge and a male portion in the medial portion of the trailing edge which allows for the male portion of a first link to be received in the female portion of a second trailing link and secured together by a pin in such a fashion as to allow both relative vertical pivotal movement and relative horizontal pivotal movement between the links.

Applicant provides an improvement to the table top chain link wherein a plurality of spaced-apart elongate rib elements are provided on the top surface of the link which extend horizontally from the front to the back of the link and which extend vertically perpendicular to the top surface thereof. The plurality of rib elements are configured so as to define a plurality of spaces therebetween which will accommodate the spaced-apart parallel teeth of a transfer comb whereby in-line transfer of articles being conveyed on one conveyor belt to another conveyor belt is facilitated.

Another embodiment of the improved table top chain link is provided wherein a low backline pressure table top chain link is modified so as to provide for spaced apart ribs on the top surface of the low backline pressure link. The modified links may be used in a conveyor belt to provide the capability for in-line transfer by transfer comb from one conveyor belt to another. This is a capability which is most desirable and has not heretofore been known in this type of chain link.

It is therefore the object of this invention to provide an improved table top chain link for use in a conveyor belt in order to allow for a conveyor belt which not only can accommodate curves during the upper run thereof but may also accomplish in-line transfer of articles being carried thereby.

DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 5:
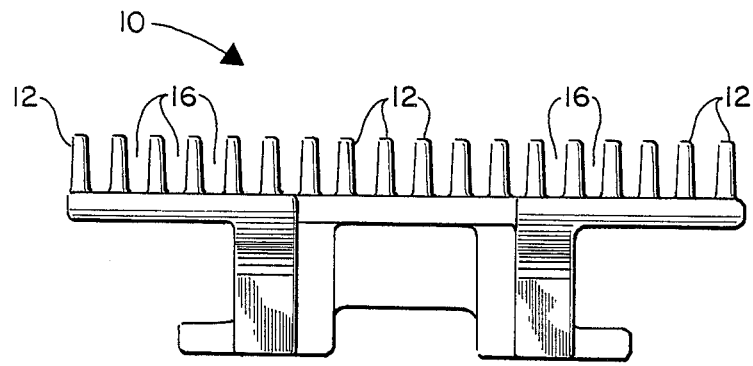
FIG. 5 is a front elevation view of the link of FIG. 1.
Figure 6:
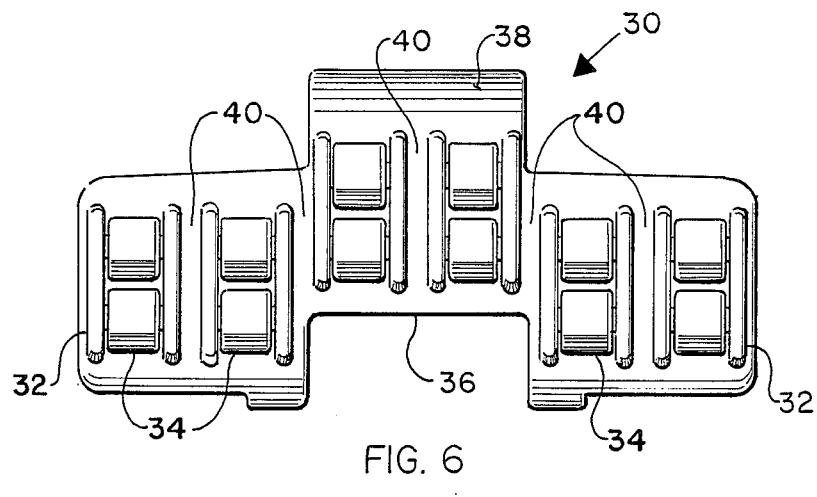
FIG. 6 is a top plan view of the link of FIG. 2.
Figure 7:
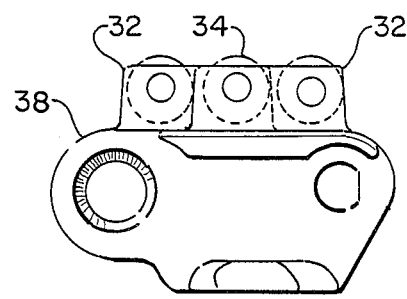
FIG. 7 is an end elevation view of the link of FIG. 2.
Figure 8:
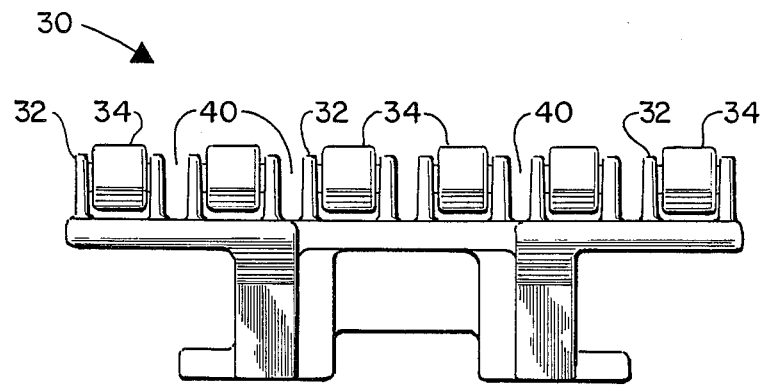
FIG. 8 is front elevation view of the link of FIG. 2.

Referring now more specifically to the drawings, FIG. 1 and FIGS. 3-5 illustrate a preferred embodiment of the improved table top chain link of the present invention. The chain link, generally designated 10, is an improvement to a conventional link known in the art and primarily available from Rexnord, Inc. of Milwaukee, Wisconsin. Table top chain link 10 includes a plurality of spaced-apart ribs 12 on the top surface thereof. Ribs 12 serve to carry articles being transported by a conveyor belt constructed of links 10 and further serve to allow the spaced-apart fingers of a transfer comb 14 (see FIGS. 13 and 14) to be slidably received within the spaces 16 (see FIGS. 3 and 5) defined between ribs 12. Ribs 12 extend horizontally substantially from the front to the back of link 10 and in a direction generally perpendicular to the longitudinal axis of link 10. Moreover, as can be seen in FIG. 5, ribs 12 extend vertically upwardly from the top surface of link 10 so as to be substantially perpendicular thereto. It is contemplated that ribs 12 will be elongate and dimensioned such that all ribs have substantially the same height and length and that the height of the ribs will be less than their length.

Typically, link 10 has a greater width than length and is available in a variety of widths ranging from 3.25 inches to 12 inches. Links 10 are arranged in a one link wide conveyor belt which is particularly adapted to accommodate one or more bends or curves during the generally straight upper run thereof due to the configuration of the linkage between the table top chain lengths. Although other construction is possible, link 10 will preferably be an injection molded plastic link defining a female portion 18 in the medial part of the leading edge thereof and a male portion 20 (see FIG. 3) in the medial part of the trailing edge so that the male portion 20 of a first link may be slidably received in the female portion 18 of a second trailing link and the links secured together by a pin (not shown) which extends generally parallel to and between the longitudinal axis of the links so as to allow for both relative vertical pivotal movement and relative horizontal pivotal movement between the leading and trailing links in a manner well known in the art.

Novel link 10 provides for heretofore unavailable and long desired in-line transfer capability from a conveyor belt constructed of a plurality of links 10 to a transfer comb 14 in addition to the previous inherent capability of accommodating curves or bends in the pathway of the upper run of the belt. Heretofore, to effect transfer from a conveyor belt constructed of table top chain links it was necessary to transfer articles being conveyed with a guide plate or the like onto a second parallel conveyor. This was a shortcoming which was reluctantly accepted by industrial users of conveyor belts constructed of table top chain links in order to gain the advantage of being able to traverse a curved pathway which a conveyor belt constructed of mattop chain links could not accomplish due to its inherent lack of lateral flexibility. Therefore, applicant's inventive link 10 provides for a conveyor belt having the advantages of both a conventional table top chain link conveyor belt and a conventional mattop chain link conveyor belt but which does not suffer the shortcomings associated with each of these conveyor belts.

A second embodiment of the present invention is illustrated in FIG. 2 and FIGS. 6-8 and generally designated 30. Link 30 is an improved low backline pressure table top chain link comprising a plurality of pairs of spaced-apart ribs 32 rotatably supporting a plurality of rollers 34 therebetween. The top surface of rollers 34 is above the top surface of ribs 32 so that articles being conveyed on a conveyor belt constructed of links 30 will be in contact with the rollers 34 in order to benefit from the advantages inherent in a low backline pressure link. As in link 10, link 30 defines a female portion 36 and a male portion 38 (see FIG. 6) at the front and back thereof, respectively, in order to facilitate proper coupling of a plurality of links 30 into a conveyor belt. The spaced-apart pairs of ribs 32 define a plurality of spaces 40 therebetween (see FIGS. 6 and 8) which are fashioned so as to slidably receive the spaced-apart teeth of a transfer comb (not shown) in order to effect the transfer of an article being carried by a conveyor belt constructed of links 30 onto a transfer comb and an associated in-line conveyor belt or the like. Link 30 allows for the construction of a conveyor belt having both the advantages of low backline pressure as well as the capability for in-line transfer of articles being transported thereon. This has not heretofore been possible with low backline pressure table top chain link conveyor belts and has been a significant shortcoming thereof.

Figure 13:
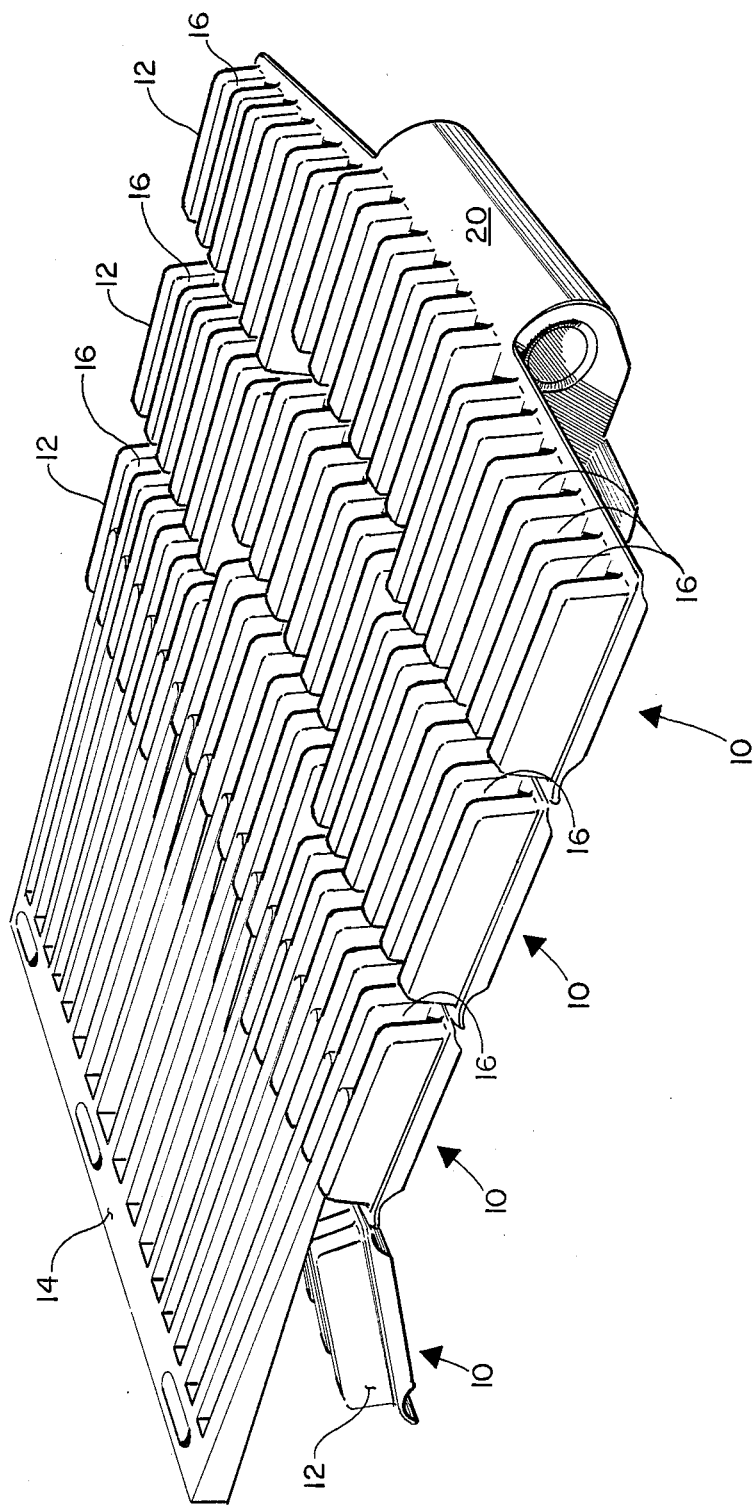
FIG. 13 is a perspective view, with parts broken away for clarity, of a conveyor belt constructed of links according to FIG. 1 and cooperatively engaging a transfer comb.
Figure 14:
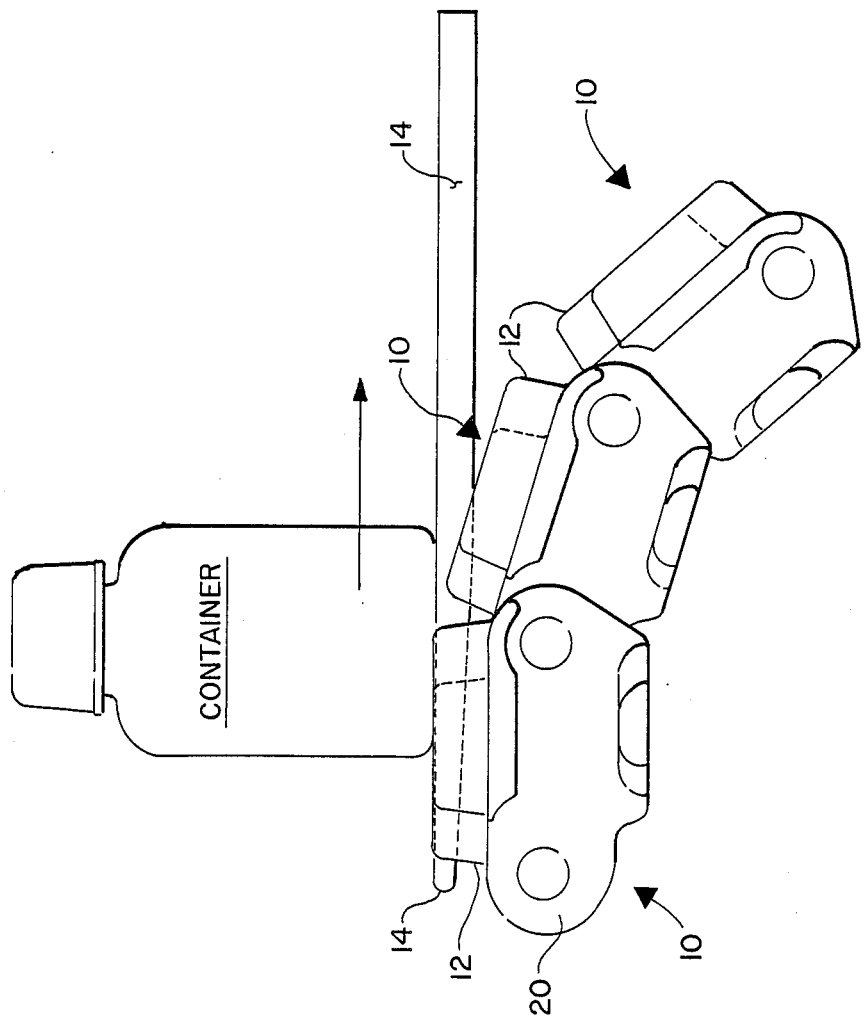
FIG. 14 is a side elevation view of a conveyor belt constructed of links according to FIG. 1 transferring an article onto a cooperatively associated transfer comb.

The aforementioned in-line transfer from a conveyor belt to a transfer comb can be more fully appreciated with reference to FIGS. 13 and 14. The conveyor belt depicted in the drawings is constructed of links 10 having ribs 12 thereon which are spaced apart so as to slidably receive the spaced-apart teeth of comb 14 therebetween. As ribs 12 slide inwardly and downwardly through the horizontally extending teeth of transfer comb 14 a container (see FIG. 14) is slidably transferred from the conveyor belt to transfer comb 14.

Figure 9:
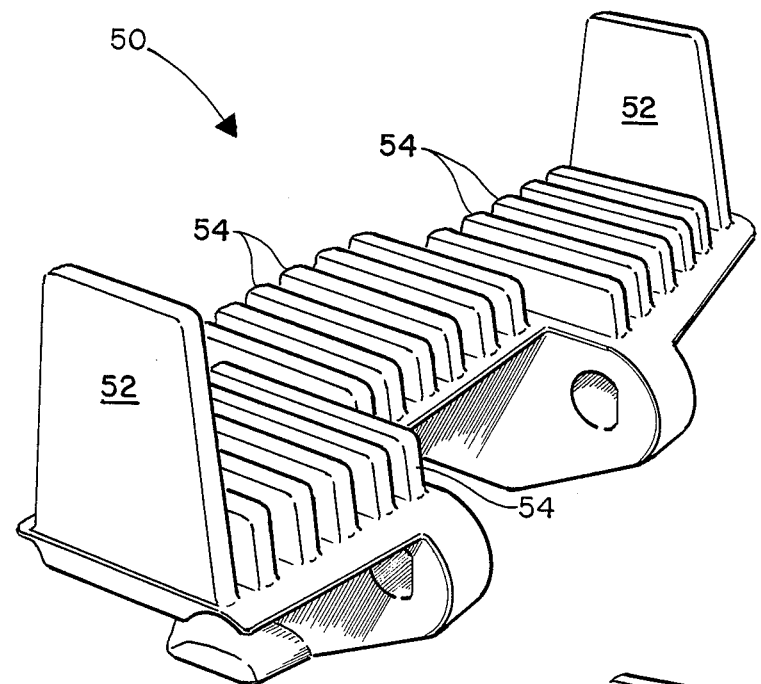
FIG. 9 is a perspective view of a third embodiment of a table top chain link embodying the invention.
Figure 11:
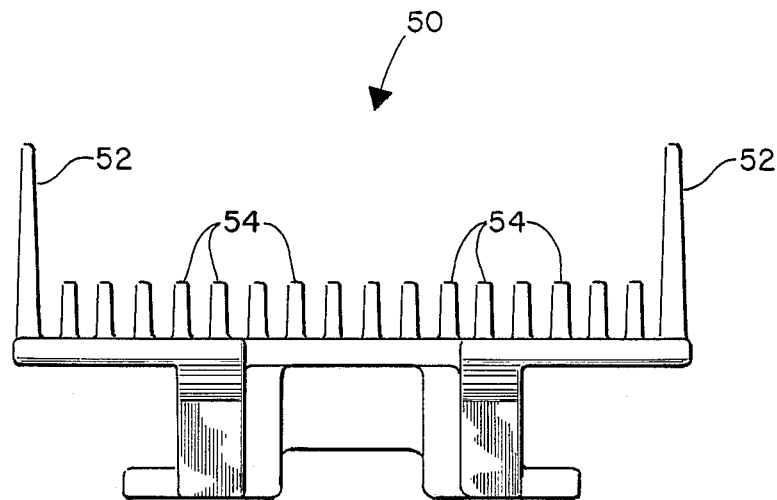
FIG. 11 is a front elevation view of the link of FIG. 9.

With reference now to FIG. 9 and FIG. 11, a third embodiment of the present invention is illustrated and generally designated 50. Link 50 is a variation of link 10 shown in FIG. 1 but includes ribs 52 positioned at the outermost edge of each side of link 50. Outermost ribs 52 extend above the height of ribs 54 therebetween and serve as a product guide in a conveyor belt constructed of table top chain links 50. Ribs 52 are preferably dimensioned such that they are substantially of the same height and length and their height is greater than their width. Ribs 52 serve to obviate the difficulties known to those familiar with the art and which arise with conventional product guides which may mark or move articles being conveyed on the conveyor belt in an undesirable fashion. Preferably, product guide ribs 52 are formed as an integral part of link 50 but they may also be formed separately and subsequently secured thereto.

Figure 1:
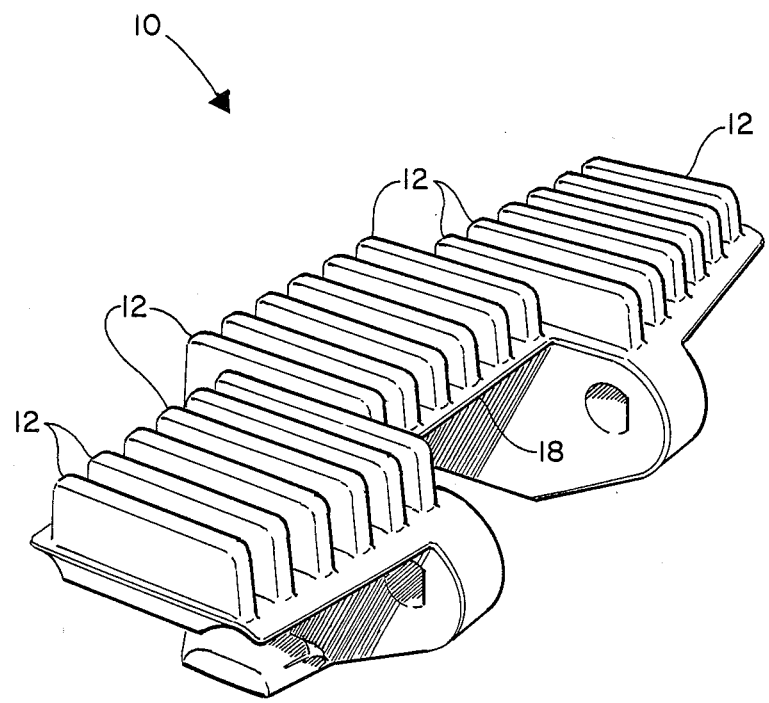
FIG. 1 is a perspective view of a first embodiment of a table top chain link embodying the invention.
Figure 2:
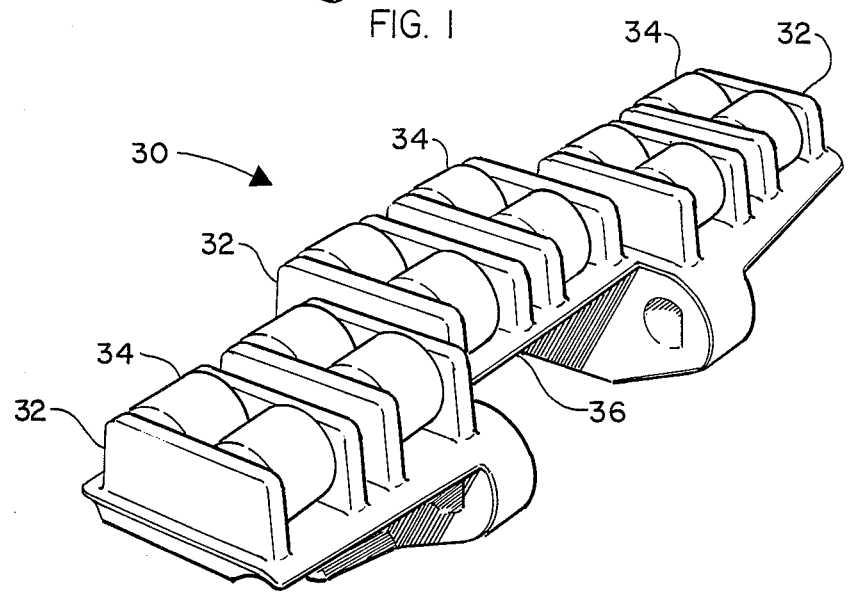
FIG. 2 is a perspective view of a second embodiment of a table top chain link embodying the invention.
Figure 3:
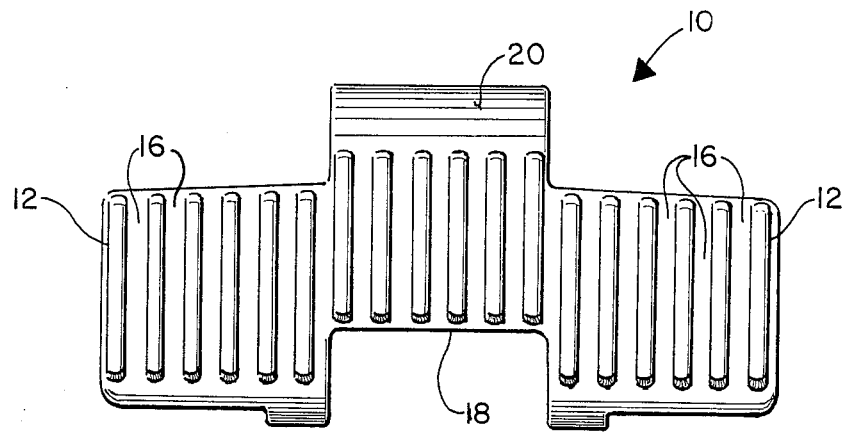
FIG. 3 is a top plan view of the link of FIG. 1.
Figure 4:
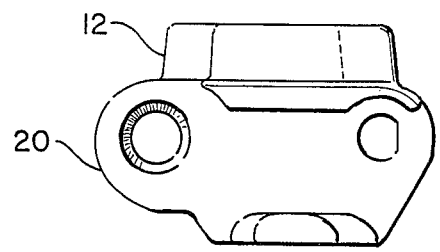
FIG. 4 is an end elevation view of the link of FIG. 1.
Figure 10:
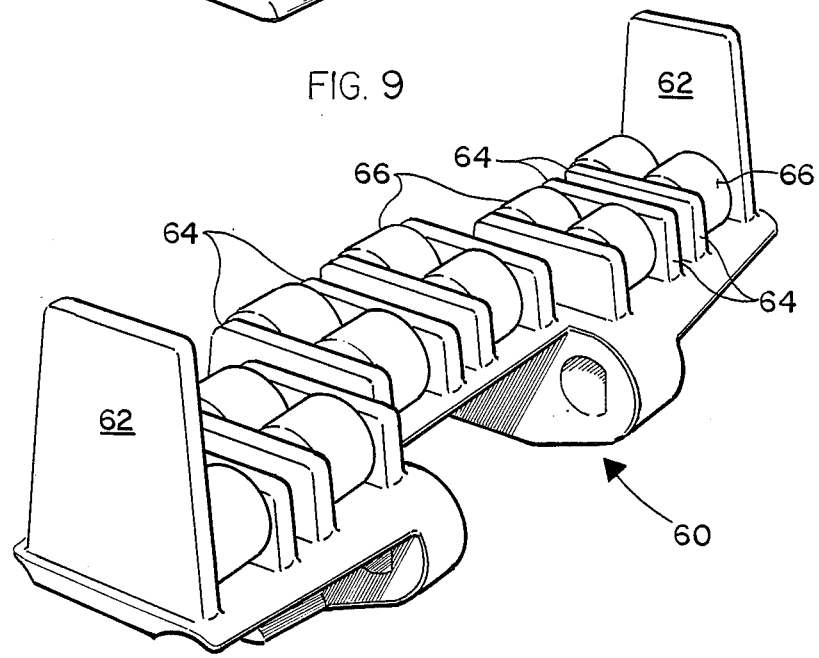
FIG. 10 is a fourth embodiment of a table top chain link embodying the invention.
Figure 12:
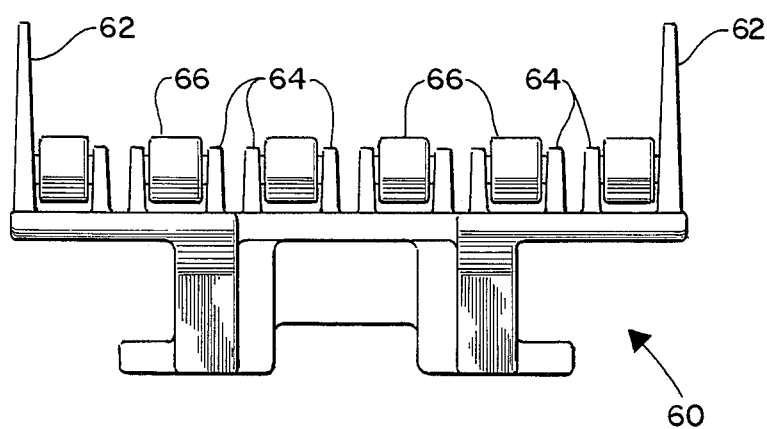
FIG. 12 is a front elevation view of the link of FIG. 10.

A fourth embodiment of the invention is shown in FIGS. 10 and 12 and is a variation of link 30 illustrated in FIG. 2. Link 60 is substantially identical to link 30 but, like link 50 in FIG. 9, is provided with upstanding ribs 62 on the outermost sides thereof which serve as product guides in a conveyor belt constructed of a plurality of links 60. Links 62 are higher than ribs 64 and rollers 66 therebetween, and most suitably, are fashioned of the same size and so as to have a height greater than their length. Link 60 provides for constructing a conveyor belt of low backline pressure table top chain links which is capable of in-line transfer of articles being carried thereon and further includes product guides to prevent damage or disturbance to the articles being transported by the conveyor belt.

It will thus be seen that there has been described above several embodiments of an improved table top chain link which allows for construction of a conveyor belt capable of in-line transfer capability not heretofore available with table top chain link conveyor belts and for which there is believed to be a long-felt need.

It will be understood that various details of the invention may be changed without departing from the scope of the invention. Furthermore, the foregoing description is for the purpose of illustration only, and not for the purpose of limitation—the invention being defined by the claims.

What is claimed is:

1. In a link having a greater width than length and used for constructing an endless single-link wide conveyor belt of the type with an upper and lower run and adapted to traverse one or more curves in the pathway along the upper run thereof, which link defines a female portion in the medial portion of the leading edge thereof and a male portion in the medial portion of the trailing edge thereof so that said male portion of a first link may be received in the female portion of a second trailing link and secured together by a pin extending generally parallel to and between the longitudinal axis of each of said links, said pin allowing both relative vertical pivotal movement and relative horizontal pivotal movement between the first and second links;

the improvement wherein said link comprises a plurality of spaced-apart upstanding rib elements on the top surface thereof, said rib elements extending a distance no greater than the distance from the front to the back of said link and defining a plurality of spaces therebetween to accommodate the spaced-apart parallel teeth of a conveyor transfer comb.

2. A link in accordance with claim 1 wherein said rib elements are integrally formed with said link.

3. A link in accordance with claim 1 wherein said rib elements are substantially perpendicular to the top surface of said link.

4. A link in accordance with claim 3 wherein said rib elements extend lengthwise in a direction substantially perpendicular to the longitudinal axis of said link.

5. A link in accordance with claim 1 wherein said rib elements are dimensioned such that all have substantially the same height and length, said height being less than said length.

6. A link in accordance with claim 1 wherein the outermost rib element on each side of said link extends to a height greater than the height of the rib elements therebetween.

7. A link in accordance with claim 6 wherein the rib elements between said outermost rib elements are dimensioned such that all have substantially the same height and length, said height being less than said length, and said outermost rib elements are dimensioned such that both have substantially the same height and length, said height being greater than said length.

8. A link in accordance with claim 1 wherein at least one roller element adapted to be freely rotatable is rotatably secured to each of a plurality of spaced-apart pairs of said rib elements so that the uppermost surface of each of said roller elements extends above the uppermost surface of said associated pair of rib elements.

9. A link in accordance with claim 8 wherein the outermost rib element on each side of said link extends to a height greater than the height of the rib elements and roller elements therebetween.

10. In a link having a greater width than length and used for constructing an endless single-link wide conveyor belt of the type with an upper and lower run and adapted to traverse one or more curves in the pathway along the upper run thereof, which link defines a female portion in the medial portion of the leading edge thereof and a male portion in the medial portion of the trailing edge thereof so that said male portion of a first link may be received in the female portion of a second trailing link and secured together by a pin extending generally parallel to and between the longitudinal axis of each of said links, said pin allowing both relative vertical pivotal movement and relative horizontal pivotal movement between the first and second links;

the improvement wherein said link comprises a plurality of integral, spaced-apart elongate rib elements on the top surface thereof, said elongate rib elements extending lengthwise generally perpendicularly to the longitudinal axis of said link a distance no greater than the distance from the front to the back of said link and extending vertically generally perpendicularly to the top surface of said link, said plurality of rib elements defining a plurality of spaces therebetween to accommodate the spaced-apart parallel teeth of a conveyor transfer comb.

11. A link in accordance with claim 10 wherein said rib elements are dimensioned such that all have substantially the same height and length, said height being less than said length.

12. A link in accordance with claim 10 wherein the outermost rib element on each side of said link extends to a height greater than the height of the rib elements therebetween.

13. A link in accordance with claim 12 wherein the rib elements between said outermost rib elements are dimensioned such that all have substantially the same height.

14. A link in accordance with claim 10 wherein at least one roller element adapted to be freely rotatable is rotatably secured to each of a plurality of spaced-apart pairs of said rib elements so that the uppermost surface of each of said roller elements extends above the uppermost surface of said associated pair of rib elements.

15. A link in accordance with claim 14 wherein the outermost rib element on each side of said link extends to a height greater than the height of the rib elements and roller elements therebetween.

* * * * *